United States Patent

Mandel et al.

[11] Patent Number: 6,115,578
[45] Date of Patent: Sep. 5, 2000

[54] DOCUMENT SCANNER WITH AUTOMATIC CONSTANT VELOCITY TRANSPORT RE-SCAN

[75] Inventors: Barry P. Mandel, Fairport; Robert J. Dash, Victor; Donald J. Gusmano, Henrietta, all of N.Y.

[73] Assignee: Xerox Corporation, Stamford, Conn.

[21] Appl. No.: 09/451,543

[22] Filed: Dec. 1, 1999

[51] Int. Cl.[7] .................................................... G03G 21/00
[52] U.S. Cl. ............................................. 399/367; 399/374
[58] Field of Search ..................................... 399/374, 367, 399/82, 85; 271/301

[56] References Cited

U.S. PATENT DOCUMENTS 5,392,109   2/1995   Acquaviva ............................... 399/374

*Primary Examiner*—Richard Moses
*Attorney, Agent, or Firm*—Lloyd F. Bean, II

[57] ABSTRACT

A document scanner, including a document input tray for holding a compilation of documents in a predetermined sequence; a document output tray for receiving documents; an imaging station for scanning each one of said compilation of documents at predefined scanning rate; an imaging transport system for moving the documents received from said document input tray through said imaging station at a first velocity; an inverter, spaced a predetermined distance from said imaging transport system for moving selected documents of said compilation of documents back to said imaging transport system, said inverter having one mode of operation for moving selected documents to said imaging transport system so that a second side of said selected documents is scanned by said imaging station, said inverter having second mode of operation for moving selected documents to said imaging transport system so that said first side of said selected documents are rescanned by said imaging station. There is also provided a processor, in communication with said imaging station and said transport system, for processing image data at a predetermined data rate, said processor includes means for sensing a data rate fault, and means for generating an error signal in response to said data fault to enable said second mode of said inverter, wherein said second mode of operation said imaging transport system moves at a second velocity which is less than said first velocity.

5 Claims, 2 Drawing Sheets

DOCUMENT SCANNER WITH AUTOMATIC CONSTANT VELOCITY TRANSPORT RE-SCAN

This invention relates generally to a scanning system, and more particularly concerns rescanning a sheet with a compilation of sheets.

BACKGROUND AND SUMMARY OF THE INVENTION

In a synchronous image scanning system, the system is designed to process the scanned images in realtime at the data rate output by the scanner. The cost of a scanning system can be reduced by reducing the system data rate. The system data rate can be reduced by 1/N if an image compression ratio of N:1 can be achieved. Since an N:1 compression ratio cannot be guaranteed for all images a scanning data rate fault would occur for complex images.

A need exists for a backup process to enable the synchronous image scanning system to capture data in rare cases, when the compression rates are less than N:1, with worst cases being 1:1. The need is more acute in scanning systems utilizing a constant velocity transport (CVT) feed roller to scan a compilation of sheets due to the fact that a scanning data rate fault requires an operator to re-order the compilation of sheets and restart the job.

An object of the present invention is to enable simple, automatic job recovery if a data rate fault occurs or a variety of faults occur when using a constant velocity transport (CVT) feed roller scanning system.

There is provided a document scanner, including a document input tray for holding a compilation of documents in a predetermined sequence; a document output tray for receiving documents; an imaging station for scanning a first said of each one of said compilation of documents at predefined scanning rate; an imaging transport system for moving the documents received from said document input tray through said imaging station at a first velocity; an inverter, spaced a predetermined distance from said imaging transport system for moving selected documents of said compilation of documents back to said imaging transport system, said inverter having one mode of operation for moving selected documents to said imaging transport system so that a second side of said selected documents is scanned by said imaging station, said inverter having second mode of operation for moving selected documents to said imaging transport system so that said first side of said selected documents is rescanned by said imaging station. There is also provided a processor, in communication with said imaging station and said transport system, for processing image data at a predetermined data rate, said processor includes means for sensing a data rate fault, and means for generating an error signal in response to said data fault to enable said second mode of said inverter, wherein said second mode of operation said imaging transport system moves at a second velocity which is less than said first velocity.

DETAILED DESCRIPTION OF THE INVENTION

Figure 1:
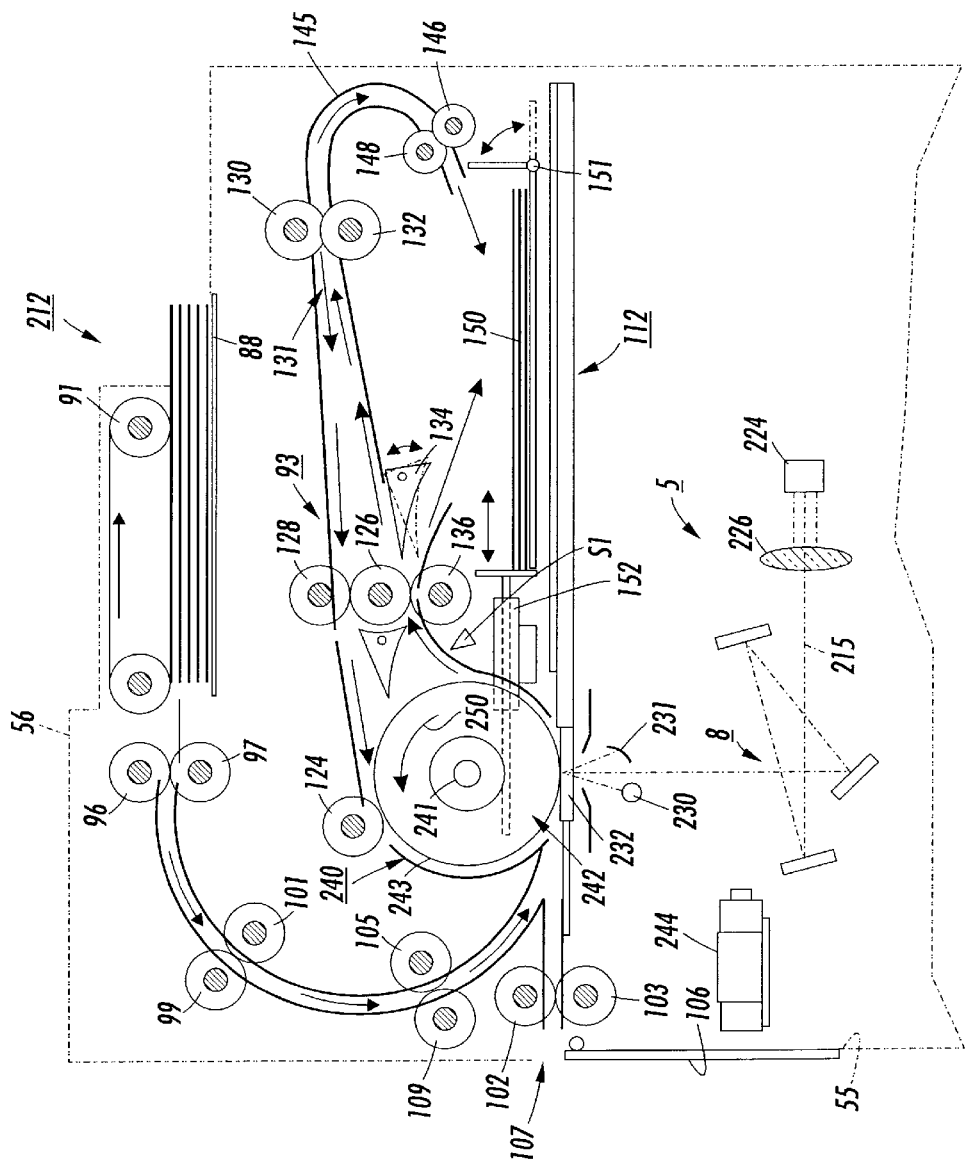
FIG. 1 is a schematic elevational view of an illustrative compact scanner incorporating a development apparatus having the features of the present invention therein.

Referring to FIG. 1, there is shown compact scanner 37. Cover 56 is pivotally mounted so that an operator can lift cover 56 and place a document on support surface member 112. Scanning assembly 5 is disposed within cover 56. In manual mode scanning, a document is placed face up on support surface member 112 so it can be incrementally scan-illuminated by scanning assembly 5. The document is scanned from left to right by scanning assembly 5. Scanning assembly 5 is adapted to travel along a path parallel to and above support surface member 112 by means of a carriage. Scanning assembly 5 illuminates an incremental line portion of the document. The reflected image is reflected by mirror assembly 8. The document image is projected along the optical path through reduction lens 226 onto a solid state photosensor array 224. Array 224, in a preferred embodiment, comprises a 1024 element CCD array of sufficient width to sense the entire image projected through lens 226. A lamp 230 illuminates the document image area thereover. To enhance illumination, a reflector 231 is disposed on the other side of the optical path 215 across from lamp 230, reflector 231 serving to reflect light emitted by lamp 230. Each photosensor generates an electrical video image signal corresponding to a detected portion of the original document. The photosensors are sampled successively as each line in the document is scanned to provide a stream of image signals or pixels for each scanned line. The output of array 224 is, thus, a stream of image signals, or pixels which pass to an image processor 25, a subassembly of central processing unit (CPU) (not shown), where the analog image signals are converted to a signal representing the scanned document. Thus, a digital image, in the form of a serial matrix or bit map representing the entire document, is stored in memory.

Alternatively, in an automatic mode the document can be scanned by employing a constant velocity transport (CVT) feed roller 240. The scanning carriage is moved to and parked at the CVT document imaging position for alternative imaging. A slit-like scanning aperture (not shown) is provided in viewing element 232, the longitudinal axis of the aperture extends in the direction substantially perpendicular to the direction of movement of the document on feed roller 240. A document handler module 212 is disposed adjacent to feed roll 240 and document handler module 212 includes transport rollers 96 and 97. Documents are loaded face up (1–N) on tray 88. Tray 88 is raised or lowered by controller 100 to maintain a feeding height of the document stack so that conveyor 91 can feed documents to transport rollers 96 and 97. The transport rollers 96, 99, 101, 109 and 105 transport the document to document feed roll 240 rotatably mounted above the scanning aperture and the viewing element 232 therein. As will appear, feed roll 240 serves to move and uniformly hold the document to be scanned across the viewing element 232. Feed roll 240 comprises an internal core member or shaft 241, normally metal, having a vacuum cylinder 243 thereabout. This may be accomplished by a "V" shaped manifold 242 inside the vacuum cylinder 243 which confines the applied vacuum to only that minor area of vacuum cylinder 243 to insure vacuum adhesion and driving of the document. The manifold is supplied with a vacuum from blower 244. The remote ends of shaft 241 of roll 240 are rotatably journaled by suitable bearings (not shown) mounted on support member. A motor (not shown) is coupled to shaft 241 by suitable means (not shown), the motor rotates feed roll 240 in the direction shown by the solid line arrow 250 upon energization of motor. Roller 124 is employed to entrain the document around feed roll 240 so that the document can enter inverter unit 93. Inverter unit 93 consists of three rollers 128, 126 and 136 and are driven by a motor (not shown).

The document enters the inverter unit 93 through a nip formed between rollers 126 and 136. Inverter unit 93 is spaced at a predetermine distance so that the trailing edge of the document passes beyond the nip formed by roller 124 and feed roll 240, while the leading edge of the document enters the inverter unit 93. A document gate 134 is positioned adjacent to inverter unit 93. The document gate 134 is controlled by controller 100 to divert the document to either a document output tray 150 or an inverter path 131. The inverter path 131 includes rollers 130 and 132 for transporting the document either back to inverter unit 93 into a nip formed between rollers 126 and 128 or for transporting the document to rollers 148 and 146 around a turn baffle 145. It is also desirable to have rollers 130 and 132 spaced at a predetermine distance from rollers 126 and 136 so that as the trailing edge of the document exits a nip, formed between rollers 126 and 136, the leading edge of the document enters a preceding nip formed between rollers 130 and 132.

With the above understanding of the elements and their organization with respect to each other in the system, the operation of the system will be readily understood and appreciated from the following description of its operation. In simplex mode operation, the document moves in the path of the arrows. Documents are put into input tray 88 face-up 1–N. The document sheet is fed out of input tray 88 by conveyor 91 to rollers 96 and 97. The exposure lamp 230 and drive motor are energized, the latter serving to rotate feed roll 240 in a counter clockwise direction shown by arrow 250. At the same time, array 224 is actuated. The leading edge of the document to be scanned is fed forward by rollers 96 and 97 onto feed roll 240. Feed roll 240 carries the document forward below viewing element 232. Scanning assembly 5 scans the document line by line as the document passes thereover. Before the trailing edge of the document passes beyond the nip formed by roller 124 and feed roll 240 the leading edge of the document enters the inverter unit 93 the nip formed between rollers 126 and 136. The rollers 126 and 136 are driving at the same velocity as feed roll 240 when the document is in contact with both nip formed between rollers 126 and 136 and the nip formed between roller 124 and feed roll 240. When the trail edge passes sensor S1 rollers 126 and 136 are driven at a faster velocity to facilitate circulation of the document.

Figure 2:
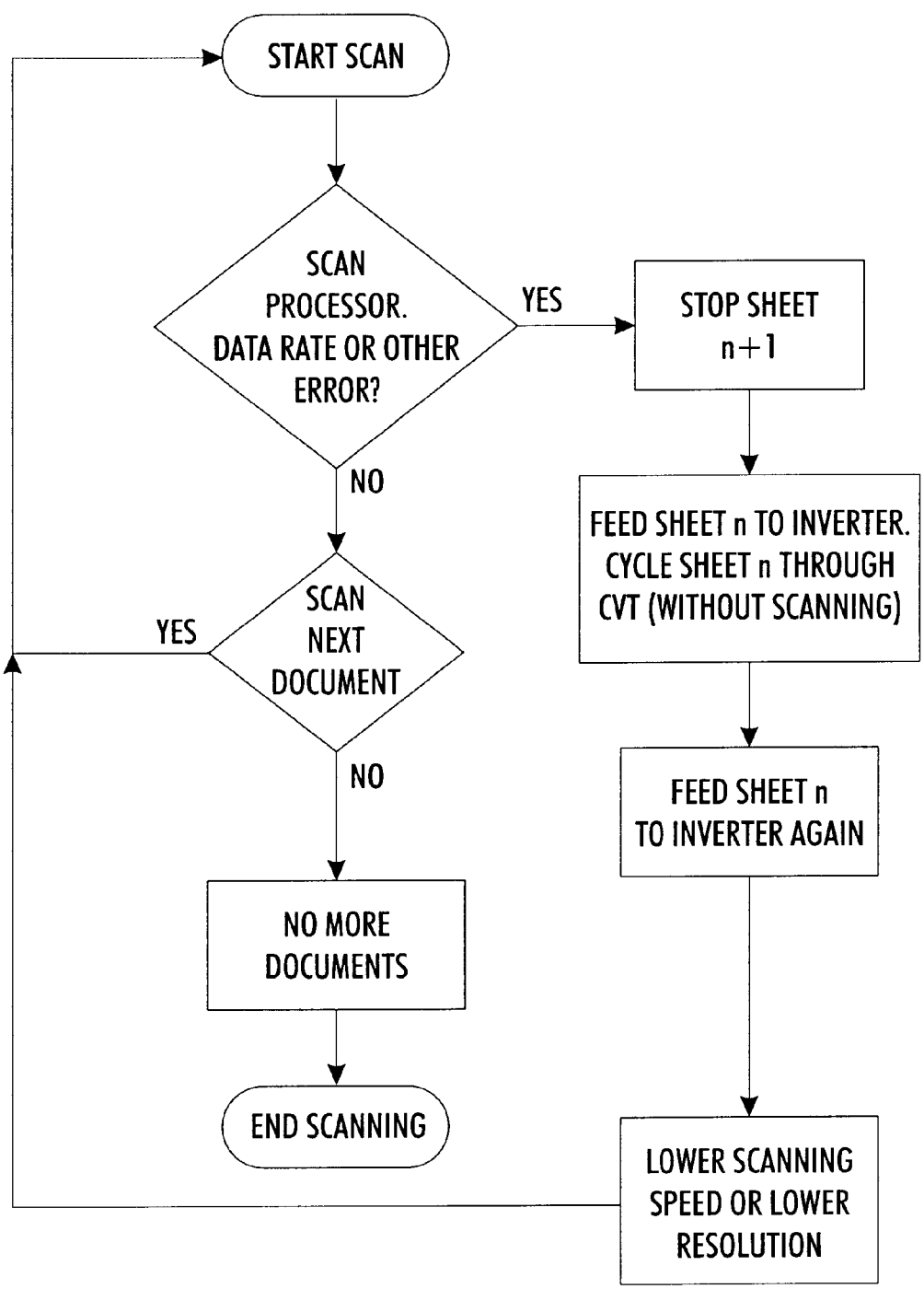
FIG. 2 is a process chart of the operation of the scanning and re-scanning functions of the present invention.

Referring to FIG. 2 a process chart of the operation of the scanning and re-scanning functions of the present invention. Upon correct scanning processing of sheet by processor 225, document gate 134 is moved to an upward position and diverts the document which are delivered 1–N face down into document output tray 150 and subsequent sheet is scanned by CVT 240. Upon incorrect scanning of processor 225, the subsequent sheet is held in a position just before CVT 240. The incorrect scanned sheet is inverted by inverter 93, fed around CVT 240 and re-inverted by inverter 93 to rescan to proper side of the sheet. The sheet is rescanned by CVT 240 at a slower scanning speed or at a lower resolution. Upon proper scanning of the rescan sheet, document gate 134 is moved to an upward position and diverts the documents which are delivered 1–N face down into document output tray 150 and subsequent sheet is scanned by CVT 240.

It is, therefore, apparent that there has been provided in accordance with the present invention, a document handler apparatus that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A document scanner, comprising:
   a document input tray for holding a compilation of documents in a predetermined sequence;
   a document output tray for receiving documents;
   an imaging station for scanning a first said of each one of said compilation of documents at predefined scanning rate, and predefined resolution;
   an imaging transport system for moving the documents received from said document input tray through said imaging station at a first velocity;
   an inverter, spaced a predetermined distance from said imaging transport system for moving selected documents of said compilation of documents back to said imaging transport system, said inverter having one mode of operation for moving selected documents to said imaging transport system so that a second side of said selected documents is scanned by said imaging station, said inverter having second mode of operation for moving selected documents to said imaging transport system so that said first side of said selected documents is rescanned by said imaging station.

2. The document scanner of claim 1, further comprising a processor, in communication with said imaging station and said transport system, for processing image data at a predetermine data rate.

3. The document scanner of claim 1, wherein said processor includes means for sensing a data rate fault, means for generating an error signal in response to said data fault to enable said second mode of said inverter.

4. The document scanner of claim 3, wherein said second mode of operation, said imaging transport system moves at a second velocity which less than said first velocity.

5. The document scanner of claim 3, wherein said second mode of operating said imaging station scans a lower resolution than said predefined resolution.

\* \* \* \* \*